United States Patent
Watanabe et al.

(10) Patent No.: US 9,499,168 B2
(45) Date of Patent: Nov. 22, 2016

(54) VEHICLE PERIPHERY DISPLAY DEVICE

(71) Applicants: Yoshiaki Watanabe, Tokyo (JP);
Takehisa Mizuguchi, Tokyo (JP);
Takeshi Mitsui, Tokyo (JP); Yoshihiro Ogawa, Tokyo (JP); Takafumi Kasuga, Tokyo (JP); Yohei Miki, Tokyo (JP);
Takeo Fujita, Tokyo (JP)

(72) Inventors: Yoshiaki Watanabe, Tokyo (JP);
Takehisa Mizuguchi, Tokyo (JP);
Takeshi Mitsui, Tokyo (JP); Yoshihiro Ogawa, Tokyo (JP); Takafumi Kasuga, Tokyo (JP); Yohei Miki, Tokyo (JP);
Takeo Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/437,797

(22) PCT Filed: Jan. 9, 2013

(86) PCT No.: PCT/JP2013/050199
§ 371 (c)(1),
(2) Date: Apr. 22, 2015

(87) PCT Pub. No.: WO2014/109016
PCT Pub. Date: Jul. 17, 2014

(65) Prior Publication Data
US 2015/0284001 A1    Oct. 8, 2015

(51) Int. Cl.
| G08G 1/16 | (2006.01) |
| B60W 30/08 | (2012.01) |
| B60W 30/09 | (2012.01) |
| H04N 7/18 | (2006.01) |
| B60K 35/00 | (2006.01) |

(52) U.S. Cl.
CPC ............ B60W 30/09 (2013.01); B60K 35/00 (2013.01); G08G 1/167 (2013.01); H04N 7/18 (2013.01); B60K 2350/106 (2013.01)

(58) Field of Classification Search
CPC combination set(s) only.
See application file for complete search history.

(56) References Cited

U.S. PATENT DOCUMENTS

| 6,593,960 B1 | 7/2003 | Sugimoto et al. |
| 2002/0005896 A1 | 1/2002 | Kumata et al. |
| 2011/0175752 A1* | 7/2011 | Augst ................... B60R 1/00 340/905 |
| 2012/0087546 A1* | 4/2012 | Focke ................... B60R 1/00 382/104 |
| 2013/0002809 A1* | 1/2013 | Shimizu ............ H04N 5/23238 348/38 |
| 2015/0145951 A1* | 5/2015 | Ko ...................... G09B 29/106 348/36 |
| 2015/0358590 A1 | 12/2015 | Hottmann et al. |

FOREIGN PATENT DOCUMENTS

| DE | 89818192 T3 | 7/2002 |
| DE | 102008034606 A1 | 1/2010 |
| DE | 202011005102 U1 | 7/2011 |
| EP | 0830267 B1 | 12/2001 |
| JP | 2001-55100 A | 2/2001 |
| JP | 2001-331789 A | 11/2001 |
| JP | 2002-109697 A | 4/2002 |
| JP | 2002-369186 A | 12/2002 |

(Continued)

*Primary Examiner* — Yonel Beaulieu
(74) *Attorney, Agent, or Firm* — Birch, Stewart, Kolasch & Birch, LLP

(57) ABSTRACT

Based on a vehicle driving condition indicated by vehicle control information, an image area to be displayed is determined from a panorama image of a vehicle periphery and a judgment is made about a collision possibility between a vehicle outside object appearing in the image area and the vehicle, so that a display image including the image area is generated and displayed on a display 16, and the vehicle is controlled to avoid its collision with the vehicle outside object according to a result of the judgment about the collision possibility.

7 Claims, 10 Drawing Sheets

(56) References Cited

FOREIGN PATENT DOCUMENTS

| JP | 2005-198160 A | 7/2005 |
| JP | 2006-54662 A | 2/2006 |
| JP | 2007-25739 A | 2/2007 |

* cited by examiner

FIG.3
(a)
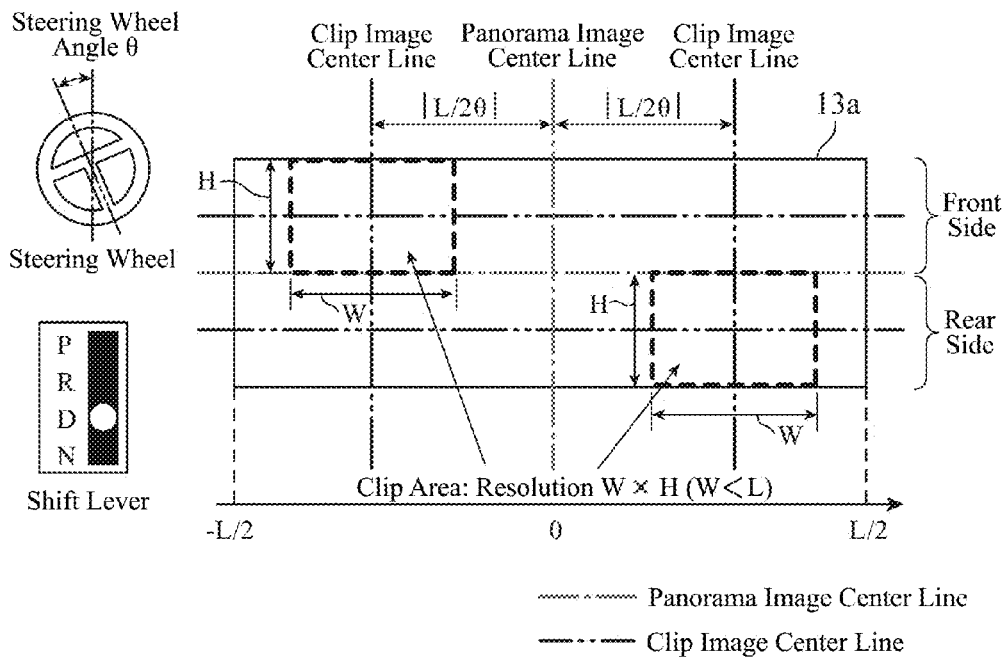
(b)
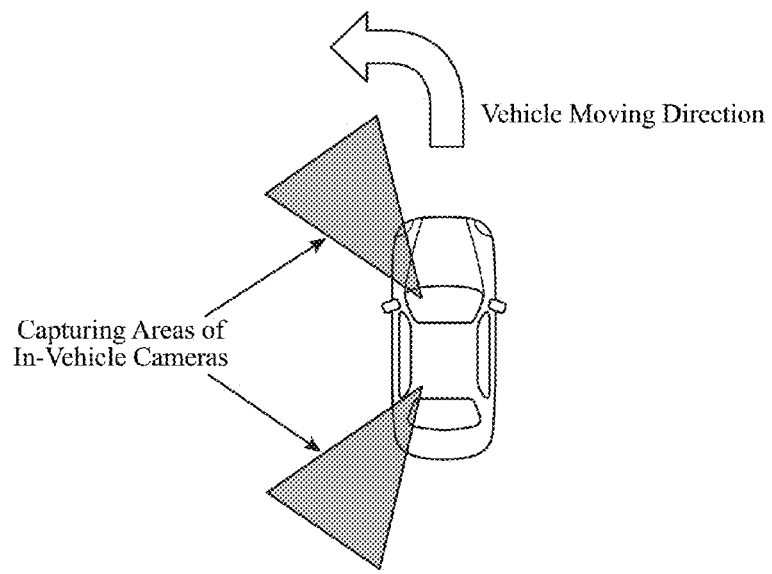

FIG.4
(a)
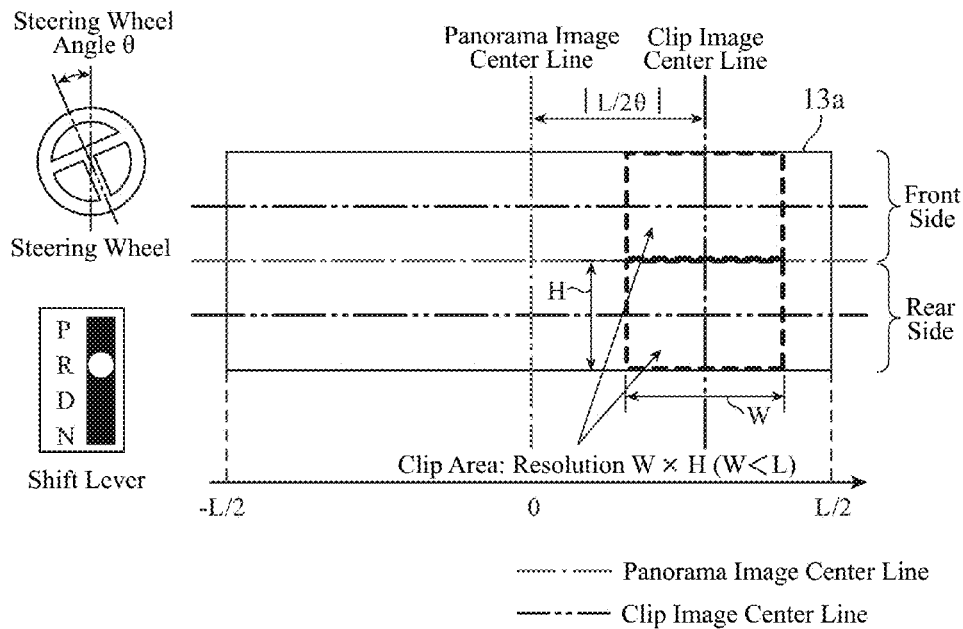
——·—— Panorama Image Center Line
———-—— Clip Image Center Line
(b)
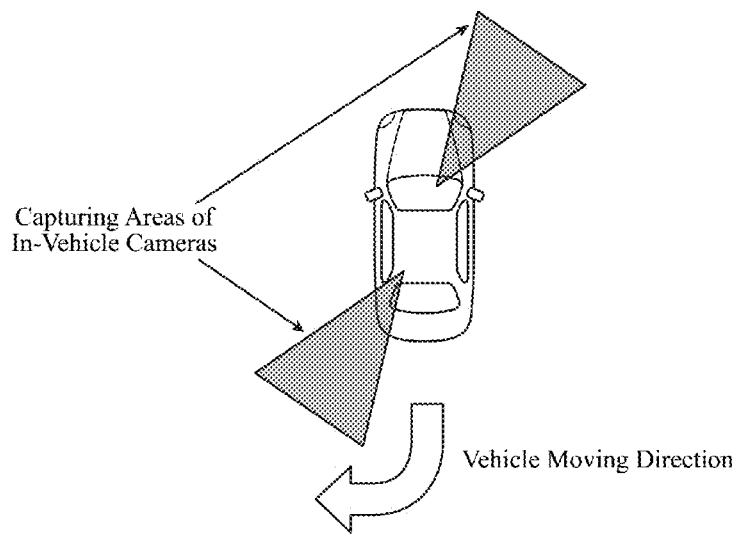

VEHICLE PERIPHERY DISPLAY DEVICE

TECHNICAL FIELD

The present invention relates to a vehicle periphery display device that presents a captured image of a vehicle periphery to a user, and controls the vehicle according to a collision possibility determined from that image.

BACKGROUND ART

For example, in Patent Document 1, there is disclosed an in-vehicle device that changes a size or an observation point of an in-vehicle camera image to be presented to the driver on the basis of a steering wheel angle and information of a shift lever position.

Further, in Patent Document 2, there is disclosed an in-vehicle camera system that generates a panorama image from in-vehicle camera images on the basis of vehicle information such as a steering wheel angle to thereby present it to the driver.

By thus presenting a vehicle periphery as the panorama image, for example, the driver can confirm around the right/left-turn direction, to thereby avoid a turn involving accident.

CITATION LIST

Patent Document

Patent Document 1: Japanese Patent Application Laid-open No. 2005-198160
Patent Document 2: Japanese Patent Application Laid-open No. 2001-55100

SUMMARY OF THE INVENTION

Problems to be Solved by the Invention

In the conventional arts represented by Patent Documents 1, 2, the vehicle periphery image is merely displayed on a screen, so that it is left to the driver's discretion to judge about an accident risk from the image. Namely, a result of the judgment about the risk based on the vehicle periphery image differs from driver to driver. Thus, there is a problem that the driving operation is possibly delayed depending on that judgment.

This invention has been made to solve the problem as described above, and an object thereof is to achieve a vehicle periphery display device that can prompt the driver to get driving that is conscious of a vehicle outside object, and can perform vehicle control to automatically avoid a collision with the vehicle outside object even if the driving operation by the driver is delayed.

Means for Solving the Problems

A vehicle periphery display device according to the invention is a vehicle periphery display device which displays a captured image of a vehicle periphery on a display, comprising: a vehicle control information receiver that acquires vehicle control information indicative of a driving condition of a vehicle; a panorama generator that combines images of the vehicle periphery in a plurality of capturing directions that are captured by a plurality of in-vehicle cameras, to generate a panorama image; an information processor that, based on the driving condition of the vehicle indicated by the vehicle control information, determines from the within panorama image an image area to be displayed and judges about a collision possibility between an vehicle outside object appearing in the image area and the vehicle; a display image generator that generates a display image including the image area determined by the information processor, to thereby display it on the display; and a vehicle controller that controls the vehicle so as to avoid its collision with the vehicle outside object according to a result of the judgment about the collision possibility by the information processor.

Effect of the Invention

According to this invention, there is provided such an effect that it is possible to prompt the driver to get driving that is conscious of a vehicle outside object, and to perform vehicle control to automatically avoid a collision with the vehicle outside object even if the driving operation by the driver is delayed.

BRIEF DESCRIPTION OF THE DRAWINGS

FIG. 3 is diagrams for showing processing (when turning left) of clipping a display area from a vehicle periphery image according to a driving condition of a vehicle.

FIG. 4 is diagrams for showing processing (when moving back) of clipping a display area from a vehicle periphery image according to a driving condition of a vehicle.

MODES FOR CARRYING OUT THE INVENTION

Hereinafter, for illustrating this invention in more detail, embodiments for carrying out the invention will be described in accordance with the accompanying drawings.

Embodiment 1

With the vehicle periphery display device according to the invention, firstly, from within a panorama image formed by combining vehicle periphery images in a plurality of capturing directions captured by a plurality of in-vehicle cameras, a vehicle periphery image necessary for the driver at each time of driving is clipped and presented in consideration of a vehicle moving direction.

In particular, in an automobile, there are many dead angles from the driver, so that vehicle accidents are mainly due to minor collisions between vehicle outside objects such as a pedestrian, a vehicle and the like that exist at the dead angles, and the host vehicle.

Thus, according to this invention, a vehicle periphery image on the line of sight that is possibly given at the dead angle from the driver is determined from a panorama image of the vehicle periphery according to a moving direction of the host vehicle. Then, a collision possibility between the vehicle outside object appearing in the image and the host vehicle is judged and is presented to the driver in a display form matched to the collision possibility. This makes it possible for the driver to visually recognize the collision possibility between the vehicle outside object appearing in the image and the host vehicle, on the basis of the display form of an image captured in a dead angle direction where the visibility during driving decreases.

However, no matter how the driver paid attention, how to avoid the collision accident is left up to the driving by the driver. Thus, with the vehicle periphery display device according to the invention, when the collision possibility between the vehicle outside object appearing in the image presented to the driver and the host vehicle was determined to be highest, said device controls the vehicle to avoid the collision accident without relying on the driving by the driver. This makes it possible to surely avoid the collision accident.

Figure 1:
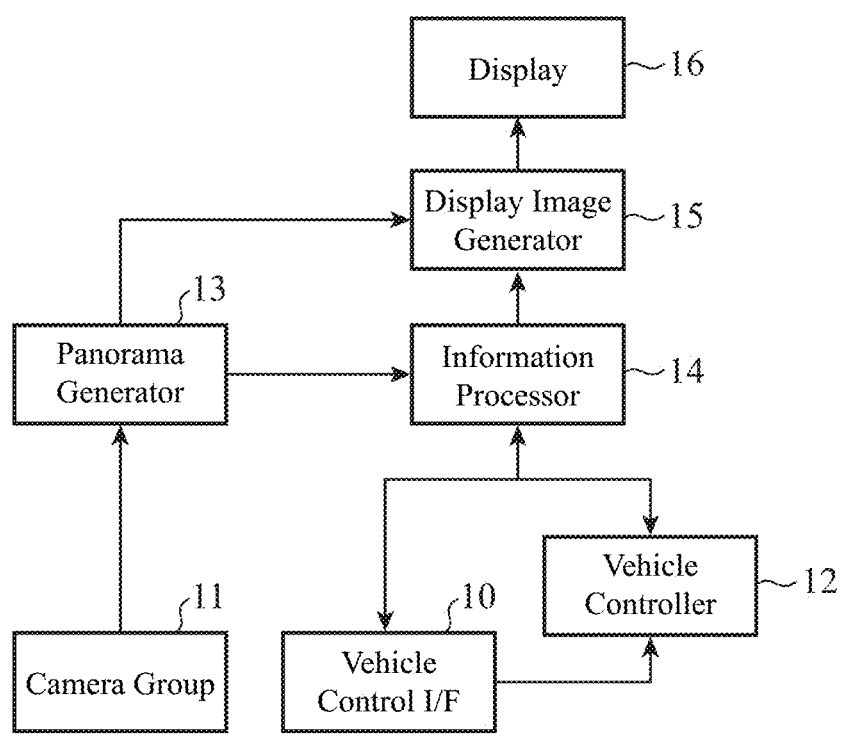
FIG. 1 is a block diagram showing a configuration of a vehicle periphery display device according to Embodiment 1 of the invention.

FIG. 1 is a block diagram showing a configuration of a vehicle periphery display device according to Embodiment 1 of the invention. The vehicle periphery display device shown in FIG. 1 is a vehicle periphery display device having the feature described above, and is configured with a vehicle control I/F 10, a camera group 11, a vehicle controller 12, a panorama generator 13, an information processor 14, a display image generator 15, and a display 16.

The vehicle control I/F 10 is a vehicle control information receiver that acquires operation signals of operation parts such as a steering wheel, a shift lever and the like, that perform driving operations of the vehicle, as vehicle control information indicative of a driving condition of the vehicle. Examples of the vehicle control information include information related to driving control of the vehicle, such as a steering angle of the steering wheel, an operation signal of the shift lever and the like. Further, the vehicle control information acquired at the vehicle control I/F 10 is outputted to the vehicle controller 12 and the information processor 14.

The camera group 11 is a plurality of in-vehicle cameras mounted at a plurality of positions on the vehicle, and captures a vehicle periphery in a plurality of directions. As the camera group 11, for example, a rear camera, a front camera, and side cameras are used that are normally mounted on the vehicle.

The vehicle controller 12 controls motion of the vehicle on the basis of the vehicle control information acquired by the vehicle control I/F 10. Further, the vehicle controller 12 controls the host vehicle according to a result of the judgment by the information processor 14 about the collision possibility between the vehicle outside object and the host vehicle. For example, when the information processor 14 judged that the collision possibility between the vehicle outside object and the host vehicle is highest, the vehicle controller 12 controls motion of the host vehicle so as to avoid its collision with the vehicle outside object specified by the information processor 14 without relying on the information from the vehicle control I/F 10.

The panorama generator 13 uses a plurality of images captured by the camera group 11 to generates a panorama image in which images of a periphery of the host vehicle in a plurality of capturing directions are coupled together. For example, the panorama generator uses a plurality of camera images captured by the camera group 11 in which imaging objects are spatially continuous, and couples together the respective camera images in consideration of lines of sight, etc. of the in-vehicle cameras so that continuity between adjacent images is ensured.

The information processor 14 determines from the panorama image of the vehicle periphery generated by the panorama generator 13, an image area to be presented to the driver, on the basis of the driving condition of the host vehicle indicated by the vehicle control information acquired by the vehicle control I/F 10. The image area to be presented to the driver is, for example, an image area captured in a direction where the visibility in a visual field from the driver decreases.

Further, the information processor 14 judges about the collision possibility between the vehicle outside object and the host vehicle on the basis of the vehicle outside object appearing in the image area determined from the panorama image and the vehicle control information acquired by the vehicle control I/F 10. For example, the information processor estimates a distance between the vehicle outside object and the host vehicle on the basis of images sequentially captured at every predetermined time interval by the camera group 11 and the position of the host vehicle, and compares the estimated distance with a predetermined threshold range to thereby judge about the collision possibility with the vehicle outside object.

Note that the information processor 14, when judged that the collision possibility between the vehicle outside object and the host vehicle is highest, outputs a control signal to the vehicle controller 12 so as to cause it to avoid the collision with the vehicle outside object.

The display image generator 15 generates a display image that includes the image area determined by the information processor 14, on the basis of the panorama image generated by the panorama generator 13 and the processing result of the information processor 14. For example, when a vehicle outside object appears in the image area to be presented to the driver determined by the information processor 14 from the panorama image of the vehicle periphery, the display image generator generates the display image in which image processing for highlighting the vehicle outside object has been performed.

The display 16 is a display for displaying the display image generated by the display image generator 15 and is realized by any kind of display placed in the vehicle or a display equipped in an information device carried in the vehicle.

Note that the vehicle control I/F 10, the vehicle controller 12, the panorama generator 13, the information processor 14 and the display image generator 15 are realized, as a software-hardware cooperative processing means, by implementing the programs in which respective functions of these configuration elements are written, by a CPU mounted in the vehicle periphery display device.

Next, the operation will be described.

Figure 2:
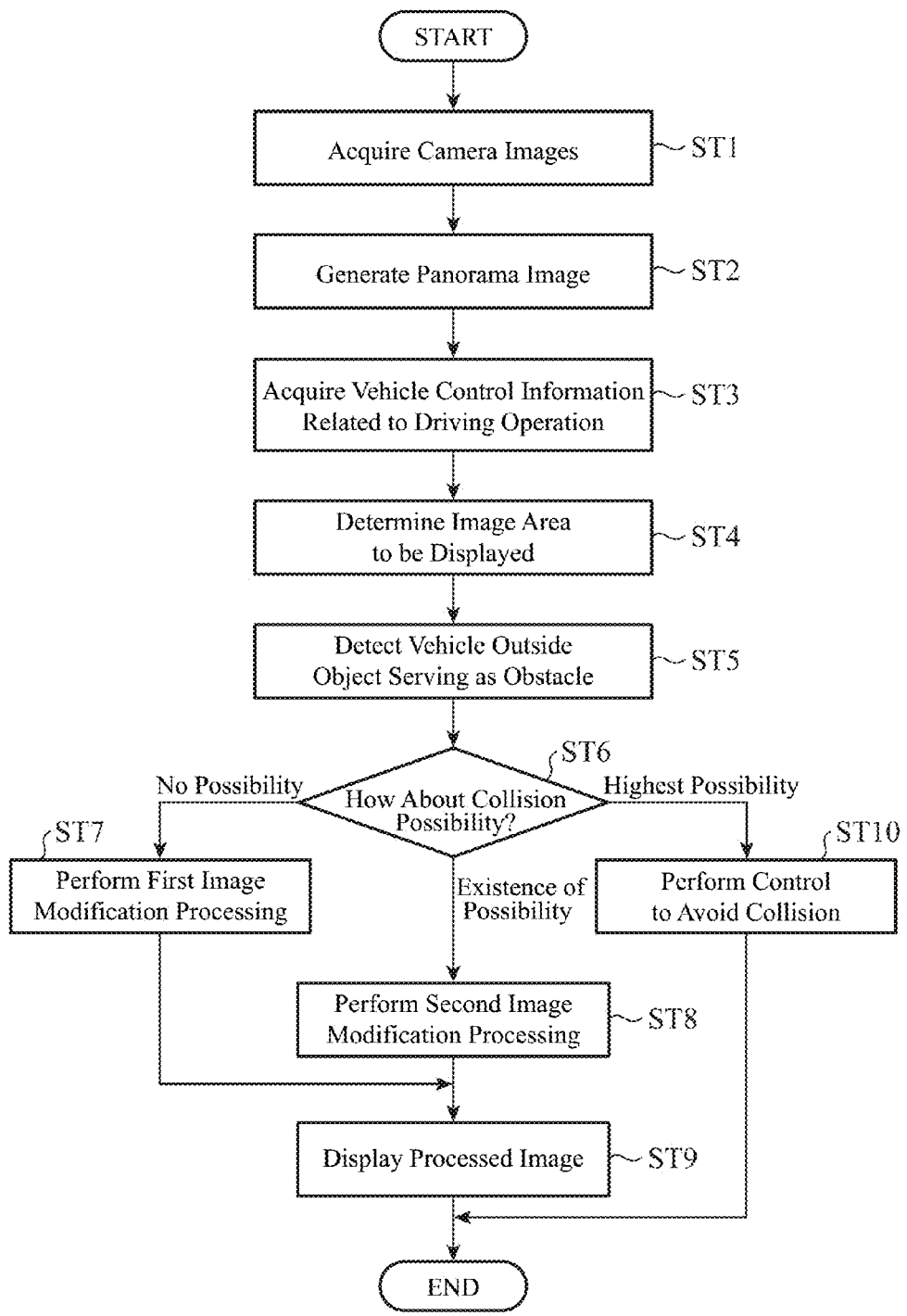
FIG. 2 is a flowchart showing an operation of the vehicle periphery display device according to Embodiment 1.

FIG. 2 is a flowchart showing the operation of the vehicle periphery display device according to Embodiment 1, and the vehicle periphery display device cyclically performs the processing in FIG. 2.

First, the respective in-vehicle cameras of the camera group 11 capture a vehicle periphery to acquire the camera images of the vehicle periphery in a plurality of capturing directions (Step ST1). For example, the respective in-vehicle cameras of the camera group 11 perform capturing periodically at every predetermined time interval to obtain images that show a time lapse change in the situation of the vehicle periphery. The camera images captured by the respective in-vehicle cameras of the camera group 11 are transmitted to the panorama generator 13.

The panorama generator 13 combines the images of the vehicle periphery in a plurality of capturing directions captured by the respective in-vehicle cameras of the camera group 11 to generate the panorama image (Step ST2). The panorama image generated by the panorama generator 13 is outputted to the information processor 14 and the display image generator 15.

Then, the vehicle control I/F 10 acquires the vehicle control information related to a driving operation (Step ST3). The vehicle control information related to a driving operation is information indicative of the driving condition of the vehicle by the driver and is, for example, information indicative of a steering angle of the steering wheel or a shift position of the shift lever acquired from a vehicle operation mechanism including the steering wheel and the shift lever. The vehicle control information acquired by the vehicle control I/F 10 is outputted to the information processor 14.

Based on the driving condition of the vehicle indicated by the vehicle control information, the information processor 14 determines from within the panorama image, the image area to be displayed (Step ST4). In this Step, for the image area of the determination result, there is generated information for specifying said image area (referred to as clipping of image), such as, in what capturing direction its image is, what portion of the panorama image the image area is, and whether a vehicle outside object that may be an obstacle is given as an imaging object. The information indicative of the image area of the determination result is outputted from the information processor 14 to the display image generator 15.

FIG. 3 is diagrams for showing processing (when turning left) of clipping the display area from the vehicle periphery image according to the driving condition of the vehicle. In a form of the panorama image shown in FIG. 3(a), the upper half of the panorama image 13a shows a vehicle-front 180° panorama image and the lower half of the panorama image 13a shows a vehicle-rear 180° panorama image. Further, when the right end of the upper half panorama image is joined with the left end of the lower half panorama image, there is provided a panorama of 360° around the vehicle (omnidirectional panorama of the vehicle). Accordingly, when the driver is viewing ahead of the vehicle, the vehicle outside object existing on the right side viewed from the driver appears around the right end of the upper half panorama image as well as around the left end of the lower half panorama image. In the followings, it is assumed that the panorama generator 13 generates the panorama image of this form. Note that this form is just an example of a form of the panorama image, and a panorama image of another form may be used.

In a condition where the panorama image 13a shown in FIG. 3(a) is obtained, when the driver turns the steering wheel to the left (steering wheel angle θ) while putting the shift lever in the drive "D", the information processor 14 determines from within the panorama image 13a, image areas surrounded by broken lines (clip images) as the image areas to be displayed. Namely, when in the driving condition of turning the vehicle to the left as shown in FIG. 3(b), frontward and rearward directions in the inner wheel side of the vehicle become directions in which the driver's visibility decreases. Thus, the left front image area and the left rear image area shown in FIG. 3(a) as being surrounded by broken lines, are clipped. For example, when the resolution of the panorama image is laterally L×vertically 2H, and a left turn is made at a steering wheel angle θ, the image areas each having a resolution of W×H and a center line (center line of the clip image) at a position L/2θ apart from the center line of the panorama image, are clipped as image areas in the frontward direction and rearward direction in the inner wheel side (left side).

When the display image including the image areas is presented to the driver by displaying it on the display 16, the driver can confirm the presence/absence of an obstacle in the inner wheel side of the vehicle, and thus it is possible to prompt him/her to get driving to avoid a turn involving accident during the left turn.

Meanwhile, FIG. 4 is diagrams for showing processing (when moving back) of clipping the display area from the vehicle periphery image according to the driving condition of the vehicle. Also in a form of the panorama image shown in FIG. 4(a), like in FIG. 3, the upper half of the panorama image 13a shows a vehicle-front 180° panorama image and the lower half of the panorama image 13a shows a vehicle-rear 180° panorama image, and when the right end of the upper half panorama image is joined with the left end of the lower half panorama image, there is provided a panorama of 360° around the vehicle (omnidirectional panorama of the vehicle).

In a condition where the panorama image 13a shown in FIG. 4(a) is obtained, when the driver puts the shift lever in the back "R" to move rearward while turning the steering wheel to the left (steering wheel angle θ), the information processor 14 determines from within the panorama image 13a, image areas surrounded by broken lines (clip images) as the image areas to be displayed. Namely, in the case of moving the vehicle in a left rearward direction as shown in FIG. 4(b), the driver is required to visually recognize around the rearward direction of the vehicle; however, in general, the driver is likely to pay less attention to the right front side of the vehicle, so that if an obstacle exists in its direction, the collision risk becomes higher. Thus, the respective right front and left rear image areas shown in FIG. 4(a) as being surrounded by broken lines are clipped. For example, when the resolution of the panorama image is laterally L×vertically 2H and the steering wheel angle is θ, the image areas having each a resolution of W×H and having a center line (center line of the clip images) at a position L/2θ apart from the center line of the panorama image, are clipped as the right front and left rear image areas.

When the display image including these image areas is presented to the driver by displaying it on the display 16, the driver can confirm the presence/absence of an obstacle in the rearward direction of the vehicle and in its diagonally opposite direction, and thus it is possible to prompt him/her to get driving to avoid a turn involving accident during the rearward movement. Note that the above method of clipping the image areas is an example and another method may be used.

Here, let's return back to the description of FIG. 2. The information processor 14, when determined from the panorama image the image area to be displayed to the driver, detects a vehicle outside object serving as an obstacle from among imaging objects in the determined image area (Step ST5). For example, from each panorama image generated from the camera images sequentially captured at every predetermined time interval by the camera group 11, the information processor sequentially determines the above image area. Upon image recognition of the vehicle outside object appearing in these image areas, if the vehicle outside object appearing in the temporally sequential image areas is gradually becoming larger, this vehicle outside object is determined to be gradually approaching to the host vehicle, so that the vehicle outside object is judged to be an vehicle outside object that may be an obstacle against the host vehicle.

The information processor 14 then judges about the collision possibility between the vehicle outside object appearing in the image area to be displayed to the driver and the host vehicle (Step ST6). For example, based on a size of the vehicle outside object appearing in the aforementioned temporally sequential image areas, the information processor estimates the relative distance between the vehicle outside object and the host vehicle. Then, it compares the estimated distance with threshold ranges indicating three conditions of "No Collision Possibility", "Existence of Collision Possibility" and "Highest Collision Possibility" to determine the corresponding situation.

When judged "No Collision Possibility", namely, that there is no collision possibility because the distance is long from the vehicle outside object serving as an obstacle, or that no vehicle outside object serving as an obstacle is detected, the information processor 14 notifies the display image generator 15 about that. Upon receiving the above notification, the display image generator 15 extracts the image area determined to be displayed by the information processor 14, from within the panorama image generated by the panorama generator 13, and applies first image processing to the image area to generate the display image (Step ST7). Note that the first image processing is processing that generates the display image including the image area clipped by the information processor 14 without applying any special image processing to the vehicle outside object as an imaging object.

Further, when judged "Existence of Collision Possibility", namely, that the distance from the vehicle outside object serving as an obstacle is shorter than in the case of "No Collision Possibility" and falls within a predetermined distance range, the information processor 14 notifies the display image generator 15 about that.

Upon receiving the above notification, the display image generator 15 extracts the image area determined to be displayed by the information processor 14 from within the panorama image generated by the panorama generator 13, and applies second image processing to the image area to generate the display image (Step ST8).

The second image processing is modification processing for causing the driver to pay attention to the vehicle outside object, and is processing that generates the display image including the image area clipped by the information processor 14 by applying image processing for highlighting the vehicle outside object as an imaging object. Examples of highlighting include, for example, surrounding the vehicle outside object with a frame, making a rim along the outline of the vehicle outside object, blinking the line of the frame or the rim, applying a warning color to the line of the frame or the rim.

Upon generating the display image including the image area in Step ST7 or Step ST8, the display image generator 15 outputs the generated display image to the display 16.

The display 16 displays on its screen the display image inputted from the display image generator 15 (Step ST9). This causes the driver to pay attention to the vehicle outside object, thus making it possible to prompt him/her to get driving to avoid the collision with the host vehicle.

Meanwhile, when judged "Highest Collision Possibility", namely, that the distance from the vehicle outside object serving as an obstacle becomes much shorter and falls within a predetermined distance range necessary to avoid the collision, the information processor 14 outputs to the vehicle controller 12 an instruction to avoid the collision, and outputs thereto information necessary to avoid the collision, such as a direction in which the target vehicle outside object exists, and the like.

Note that the distance range necessary to avoid the collision is, for example, a range of several meters as the distance between the vehicle outside object and the host vehicle, which is a distance range where the collision with the vehicle outside object is predicted to be unavoidable if the driver is making a determination about driving operation.

Upon receiving the above instruction, the vehicle controller 12 controls the motion of the host vehicle to avoid the collision on the basis of the information necessary to avoid the collision without relying on the driving by the driver (Step ST10).

For example, the vehicle controller 12 inputs the vehicle control information from the vehicle control I/F 10 to specify the driving condition of the host vehicle, and, with respect to the image area clipped according to that condition, specifies an approximate position of the vehicle outside object from a temporal change, etc. in the image area, thereby to change the moving direction of the host vehicle so as to avoid the direction in which the vehicle outside object exists, or to reduce the moving speed in the direction in which the vehicle outside object exists, or to stop driving of the host vehicle.

Note that when the moving direction of the vehicle is to be changed, the information processor 14 specifies beforehand from the panorama image of the vehicle periphery, a safe direction in which no vehicle outside object exists, and also transmits information indicative of the safe direction to the vehicle controller 12 together with the instruction to avoid the collision. This makes it possible for the vehicle controller 12 to change the vehicle moving direction to the direction in which no vehicle outside object exists and which is safe.

As described above, according to Embodiment 1, it comprises: the vehicle control I/F 10 that acquires vehicle control information indicative of a driving condition of the vehicle; the panorama generator 13 that combines images of a vehicle periphery in a plurality of capturing directions that are captured by the camera group 11 to thereby generate a panorama image of the vehicle periphery; the information processor 14 that, based on the driving condition of the vehicle indicated by the vehicle control information, determines from the panorama image of the vehicle periphery an image area to be displayed, and judges about the collision possibility between an vehicle outside object appearing in the image area and the vehicle; the display image generator 15 that generates a display image including the image area determined by the information processor 14, to thereby display it on the display 16; and the vehicle controller 12 that controls the vehicle so as to avoid its collision with the vehicle outside object according to a result of the judgment about the collision possibility by the information processor 14.

By providing the thus-described configuration, it is possible to prompt the driver to get driving to avoid the collision with the vehicle outside object according to the collision possibility with the vehicle outside object judged from the captured images of the vehicle periphery.

Further, for example, when falling in the distance range where the collision with the vehicle outside object is unavoidable if the driver is making a determination about driving operation, the host vehicle is automatically controlled to avoid the collision with the vehicle outside object, so that the collision accident can be surely avoided.

Further, according to Embodiment 1, the display image generator 15 generates a display image in which, in the image area to be displayed, an area where the vehicle outside object appears has been processed into a display form matched to the collision possibility between the vehicle outside object and the vehicle. This causes the driver to pay attention to the vehicle outside object on the basis of the display image, thus making it possible to prompt him/her to get driving to avoid the collision with the host vehicle.

Furthermore, according to Embodiment 1, the information processor 14 determines from the panorama image of the vehicle periphery, an image area captured in the direction in which the driver's visibility decreases, as the image area to be displayed. This makes it possible to properly present to the driver the image in the direction in which attention is required, according to the driving condition.

Embodiment 2

A vehicle periphery display device according to Embodiment 2 displays, with respect to the image area to be displayed to the driver, from what portion of the panorama image the image area has been clipped, namely, to what capturing direction in the vehicle periphery its image corresponds, as being included in the display image. This allows the driver to easily understand in what direction the presented image has been captured.

Figure 5:
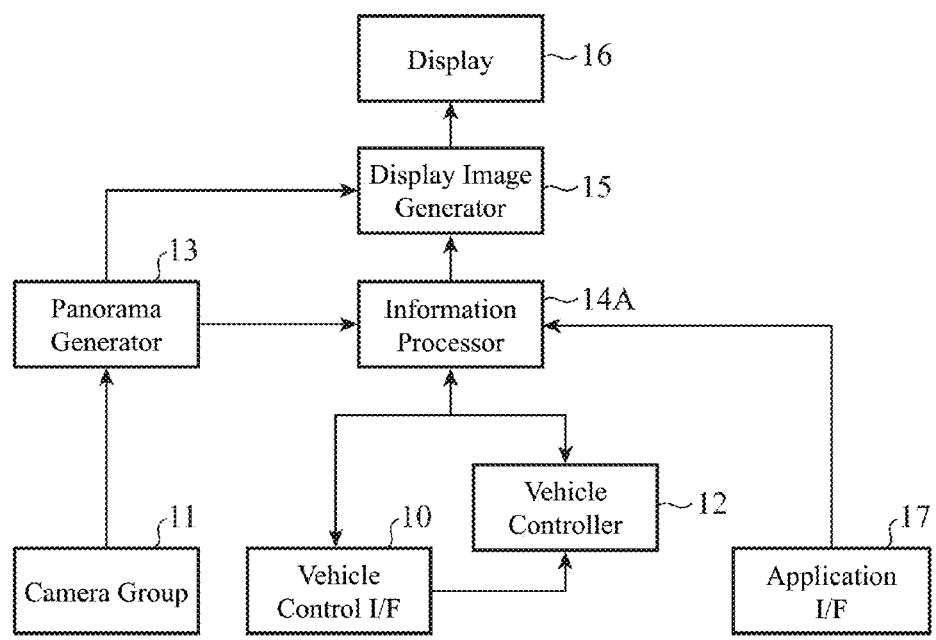
FIG. 5 is a block diagram showing a configuration of a vehicle periphery display device according to Embodiment 2 of the invention.

FIG. 5 is a block diagram showing a configuration of the vehicle periphery display device according to Embodiment 2 of the invention. The vehicle periphery display device shown in FIG. 5 is configured with a vehicle control I/F 10, a camera group 11, a vehicle controller 12, a panorama generator 13, an information processor 14A, a display image generator 15, a display 16 and an application I/F 17. Note that, in FIG. 5, the configuration elements to which the same reference numerals as in FIG. 1 are applied function similarly to Embodiment 1, so that description thereof is omitted.

The application I/F 17 is an interface for notifying the information processor 14A of operation information of a predetermined operation part by the driver, and in particular, it receives the operation information for instructing the information processor 14A to include, in the display image, information indicative of the capturing direction of the image area clipped from the panorama image. Note that the predetermined operation part is an operation part that allows the driver to perform an operation when appropriate, examples of which include, for example, an input button placed on the steering wheel, and the like.

The information processor 14A basically operates similarly to Embodiment 1; however, when acquired the above operation information through the application I/F 17, the information processor notifies the display image generator 15 of information indicating from what area of the panorama image the image area to be presented to the driver has been clipped, namely, in what direction in the vehicle periphery the image area has been captured.

The display image generator 15 generates the display image that includes the information inputted from the information processor 14A and indicative of the capturing direction of the image area.

The vehicle control I/F 10, the vehicle controller 12, the panorama generator 13, the information processor 14A, the display image generator 15 and the application I/F 17 are realized, as a software-hardware cooperative processing means, by implementing the programs in which respective functions of these configuration elements are written, by a CPU mounted in the vehicle periphery display device.

Next, the operation will be described.

Figure 6:
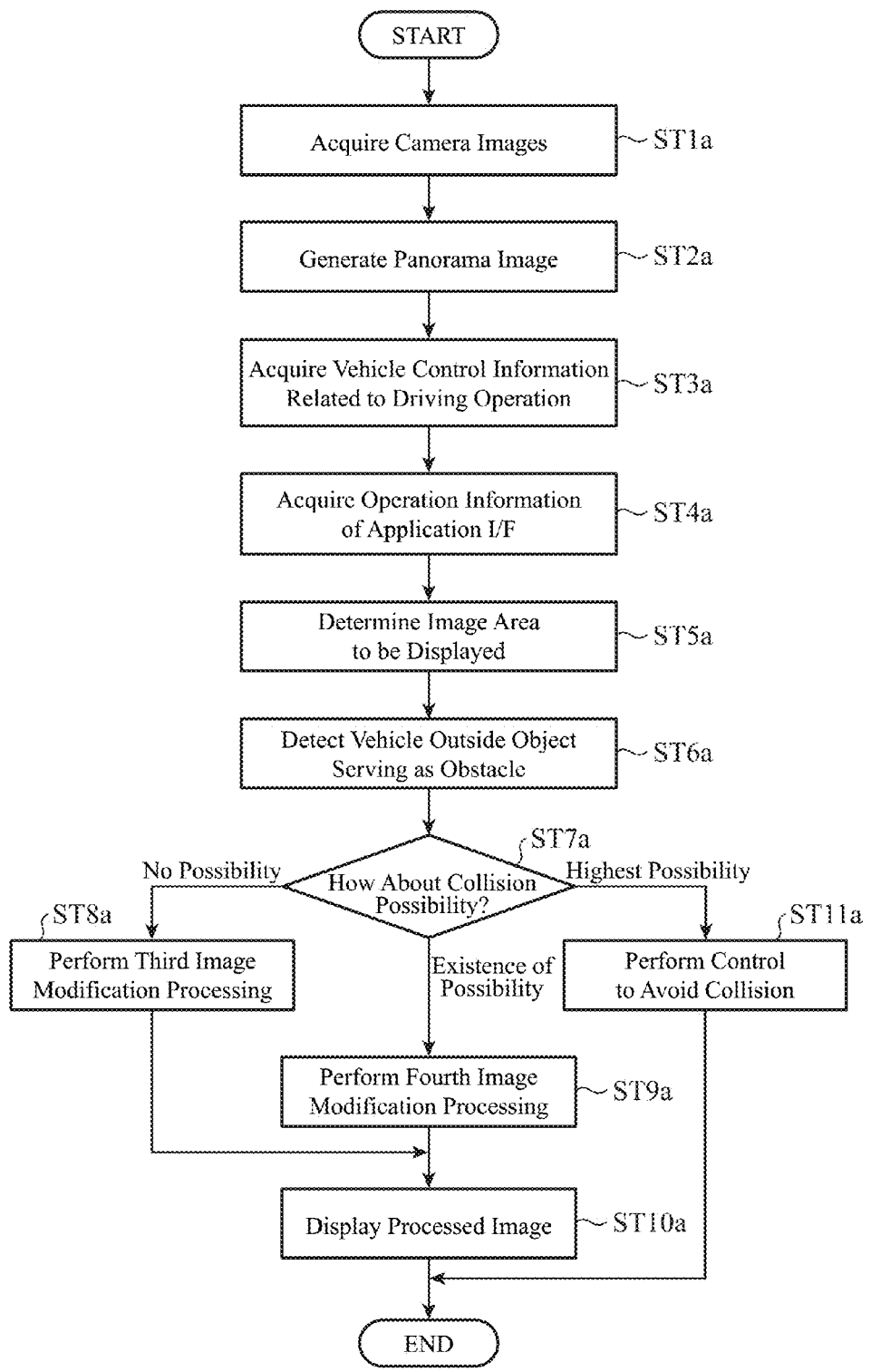
FIG. 6 is a flowchart showing an operation of the vehicle periphery display device according to Embodiment 2.

FIG. 6 is a flowchart showing the operation of the vehicle periphery display device according to Embodiment 2, and the vehicle periphery display device cyclically performs the processing in FIG. 6. In the processing by this flowchart, processing different to that in FIG. 1 is shown below.

In Step ST4a, the information processor 14A acquires the operation information of the application I/F 17. Namely, when the driver operates the operation part, such as an input button placed on the steering wheel, or the like, its operation information is inputted to the information processor 14A through the application I/F 17.

In Step ST7a, when judged "No Collision Possibility" with respect to the vehicle outside object appearing in the determined image area, the information processor 14A notifies the display image generator 15 of the result of this judgment and the information indicative of the capturing direction of the image area.

Upon receiving the above notification, the display image generator 15 extracts from the panorama image generated by the panorama generator 13 the image area determined to be displayed by the information processor 14A, and applies third image processing to the image area to generate the display image (Step ST8a).

Note that the third image processing is processing that generates the display image including the image area clipped by the information processor 14 by applying to that area, image processing for displaying it with the capturing direction thereof, without applying any special image processing to the vehicle outside object as an imaging object.

Meanwhile, in Step ST7a, when judged "Existence of Collision Possibility" with respect to the vehicle outside object appearing in the determined image area, the information processor 14A notifies the display image generator 15 of the result of this judgment and the information indicative of the capturing direction of the image area.

Upon receiving the above notification, the display image generator 15 extracts from the panorama image generated by the panorama generator 13 the image area determined to be displayed by the information processor 14A, and applies fourth image processing to the image area to generate the display image (Step ST9a).

Note that the fourth image processing is modification processing for causing the driver to pay attention to the vehicle outside object, and is processing that generates the display image including the image area clipped by the information processor 14 by applying image processing for highlighting the vehicle outside object as an imaging object and for displaying the image area with its capturing direction.

Upon generating the display image in Step ST8a or Step ST9a, the display image generator 15 outputs the generated display image to the display 16.

The display 16 displays on its screen the display image inputted from the display image generator 15 (Step ST10a).

As described above, according to Embodiment 2, the information processor 14A outputs the information indicative of the capturing direction of the image area determined from the panorama image of the vehicle periphery to the display image generator 15, and the display image generator 15 generates the display image including the image area and the information indicative of its capturing direction. This allows the driver to understand from the display image the vehicle outside object and the direction in which the vehicle outside exists, so that it is possible to cause the driver to pay attention to the vehicle outside object, to thereby prompt him/her to get driving to avoid the collision with the host vehicle more properly.

Embodiment 3

In a vehicle periphery display device according to Embodiment 3, the size of the image area to be determined from the panorama image of the vehicle periphery is changed based on a traveling condition of the vehicle specified from vehicle information.

Figure 7:
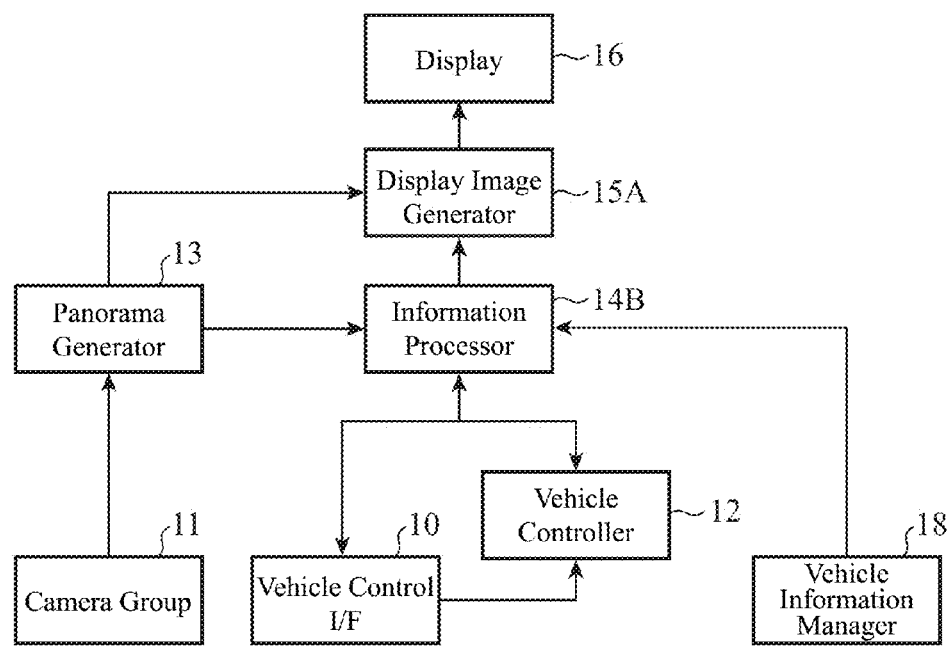
FIG. 7 is a block diagram showing a configuration of a vehicle periphery display device according to Embodiment 3 of the invention.

FIG. 7 is a block diagram showing a configuration of the vehicle periphery display device according to Embodiment 3 of the invention. The vehicle periphery display device shown in FIG. 7 is configured with a vehicle control I/F 10, a camera group 11, a vehicle controller 12, a panorama generator 13, an information processor 14B, a display image generator 15A, a display 16 and a vehicle information manager 18. Note that, in FIG. 7, the configuration elements to which the same reference numerals as in FIG. 1 are applied function similarly to Embodiment 1, so that description thereof is omitted.

The vehicle information manager 18 manages the vehicle information by acquiring it from the drive mechanism of the vehicle, and presents it upon request to the request source. Note that the vehicle information is information indicative of the traveling condition of the vehicle, examples of which include a vehicle speed, an acceleration rate.

The information processor 14B changes the size of the image area to be determined from the panorama image of the vehicle periphery (hereinafter, referred to as clip image area) on the basis of the traveling condition of the vehicle specified from the vehicle information. For example, it enlarges or reduces the size of the clip image area according to the vehicle speed.

The display image generator 15A generates the display image that includes the image area determined by the information processor 14B in the size matched to the traveling condition of the vehicle.

The vehicle control I/F 10, the vehicle controller 12, the panorama generator 13, the information processor 14B, the display image generator 15A and the vehicle information manager 18 are realized, as a software-hardware cooperative processing means, by implementing the programs in which respective functions of these configuration elements are written, by a CPU mounted in the vehicle periphery display device.

Next, the operation will be described.

Figure 8:
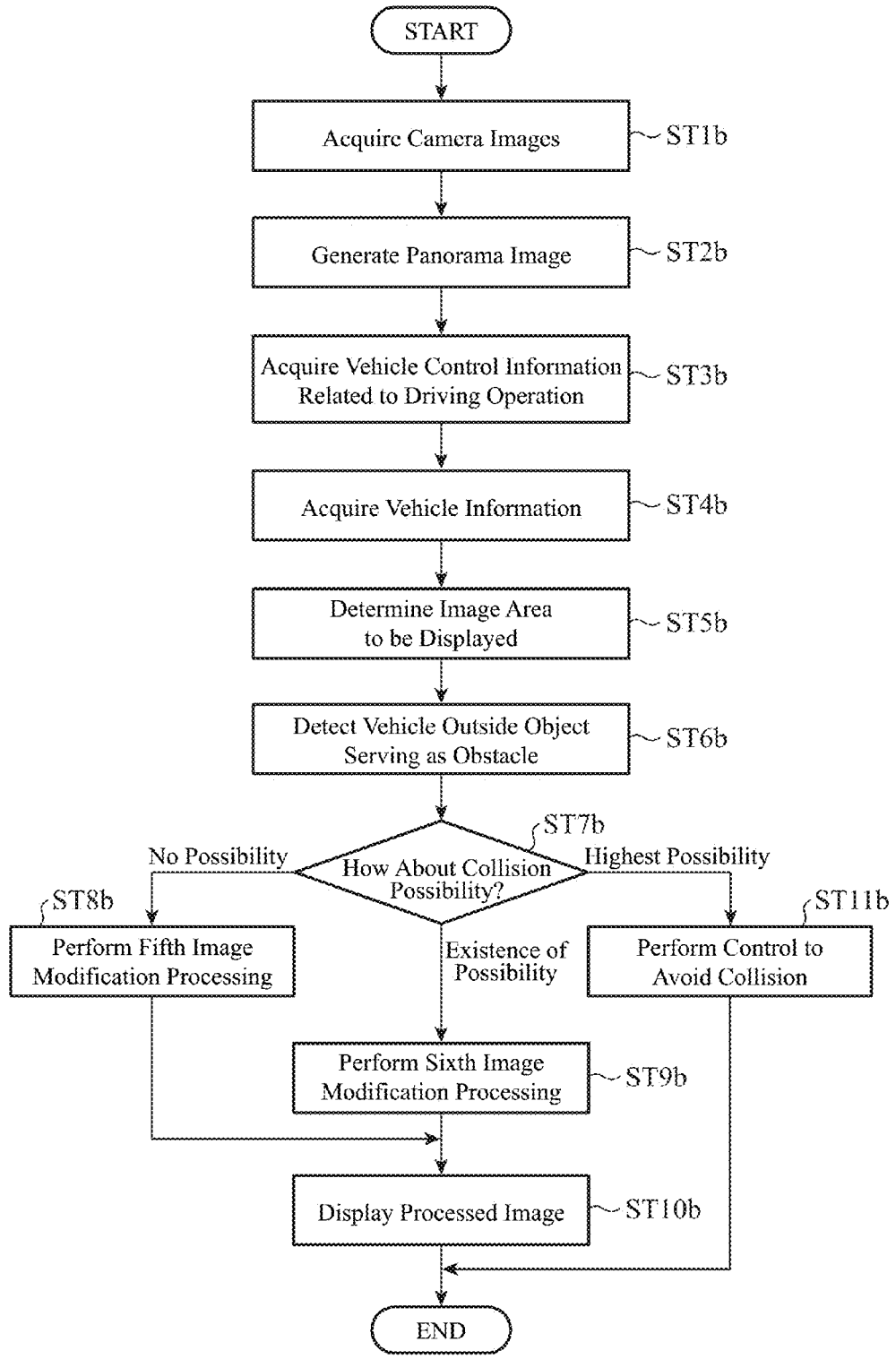
FIG. 8 is a flowchart showing an operation of the vehicle periphery display device according to Embodiment 3.

FIG. 8 is a flowchart showing the operation of the vehicle periphery display device according to Embodiment 3, and the vehicle periphery display device cyclically performs the processing in FIG. 8. In the processing by this flowchart, processing different to that in FIG. 1 is shown below.

In Step ST4b, the information processor 14B makes a request for the vehicle information to the vehicle information manager 18 to thereby acquire the vehicle information indicative of the current traveling condition of the vehicle.

Then, the information processor 14B determines from the panorama image the clip image area with the size matched to the current traveling condition of the vehicle (Step ST5b).

Figure 9:
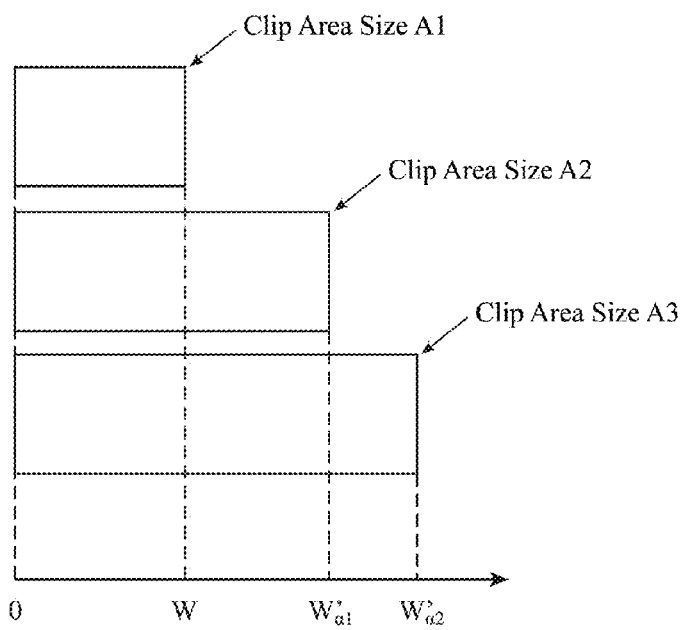
FIG. 9 is a diagram showing an example of processing of changing a size of an image area according to a traveling condition of a vehicle.

FIG. 9 is a diagram showing an example of processing of changing the size of the image area according to the traveling condition of the vehicle. Here, description will be made about processing of clipping the image area in the size matched to the vehicle speed and the acceleration rate of the vehicle. Note that, in FIG. 9, the vertical size of the clip image area is fixed regardless of the traveling condition, but its lateral size is changed according to the vehicle speed and the acceleration rate.

For example, among three traveling conditions (Case A, Case B, Case C), the traveling condition of Case A is assumed to have the vehicle speed V and the acceleration rate $\alpha F$, and this traveling condition is used as a reference with which the size A1 of the clipping image area is represented by lateral W×vertical H. Further, the information processor 14B calculates the lateral size of the clip image area using a function of the vehicle speed V and the acceleration rate $\alpha$.

Here, in the traveling condition B, although the vehicle speed is the same as in Case A, the acceleration rate is $\alpha 1$ (>$\alpha F$). In this case, the visual field of the driver becomes narrower by a degree corresponding to the increase in the acceleration rate.

Thus, in order to present the captured image area with a wider range of visual field, as shown in FIG. 9, the information processor 14B determines (clips) a clip image area, that is laterally larger than the clip image area in Case A, with the size $W'_{\alpha 1}$ (>W) (Size A2=$W'_{\alpha 1}$×H) from the panorama image.

Furthermore, in the traveling condition C, although the vehicle speed is the same as in Cases A, B, the acceleration rate is $\alpha 2$ (>$\alpha 1$). In this case, the visual field of the driver becomes much narrower by a degree corresponding to the increase in the acceleration rate.

Thus, in order to present the captured image area with a wider range of visual field, as shown in FIG. 9, the information processor 14B determines (clips) a clip image area, that is laterally larger than the clip image area in Case B, with the size $W'_{\alpha 2}$ (>$W'_{\alpha 1}$) (Size A3=$W'_{\alpha 2}$×H) from the panorama image.

Returning back to the description of FIG. 8, in Step ST8b, the display image generator 15A extracts from the panorama image generated by the panorama generator 13, the image area determined to be displayed by the information processor 14B, and applies fifth image processing to the image area to generate the display image.

Note that the fifth image processing is processing that generates the display image including the image area clipped in the size according to the traveling condition of the vehicle without applying any special image processing to the vehicle outside object as an imaging object.

Further, in Step ST9b, the display image generator 15A extracts from the panorama image generated by the panorama generator 13, the image area determined to be displayed by the information processor 14, and applies sixth image processing to the image area to generate the display image.

Note that the sixth image processing is modification processing for causing the driver to pay attention to the vehicle outside object, and is processing that generates the display image including the image area clipped in the size according to the traveling condition of the vehicle, after highlighting the vehicle outside object as an imaging object.

Upon generating the display image in Step ST8b or Step ST9b, the display image generator 15A outputs the generated display image to the display 16.

The display 16 displays on its screen the display image inputted from the display image generator 15A (Step ST10b).

As described above, according to Embodiment 3, it comprises the vehicle information manager 13 that retains the vehicle information indicative of the traveling condition of the vehicle and that presents the vehicle information upon request to the request source, wherein the information processor 145 changes the size of the image area to be determined from the panorama image of the vehicle periphery, according to the traveling condition of the vehicle specified from the vehicle information. This makes it possible, even when the visual field of the driver changes according to the traveling condition of the vehicle, to determine and present from the panorama image, the image area with a range of visual field matched to that visual field. Accordingly, it is possible to cause the driver to properly pay attention to the vehicle outside object to thereby avoid the collision with the host vehicle more surely.

Embodiment 4

In a vehicle periphery display device according to Embodiment 4, an image area matched to a condition specified by a carried-in device that is an external device carried in the vehicle is determined from the panorama image of the vehicle periphery, and the display image including the image area is displayed on the carried-in device. This allows the operator of the carried-in device to confirm a situation of the vehicle periphery, and to become able to give an advice on driving to the driver on the basis of the confirmed situation. Examples of use case include supporting the driver who lacks confidence in driving, and assisting driving in the case of passing through a narrow path, such as a mountain road.

Figure 10:
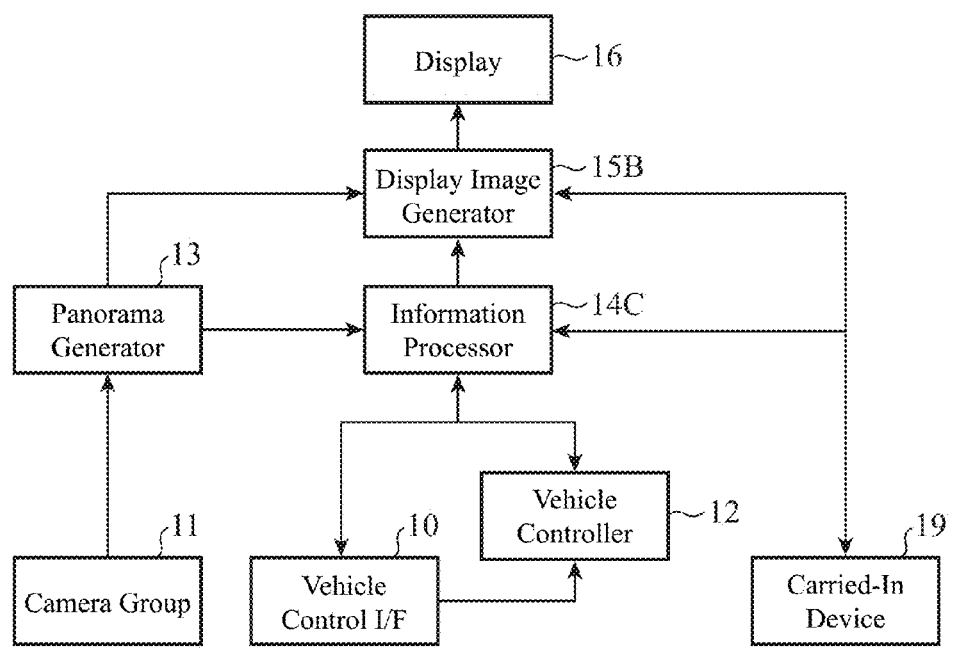
FIG. 10 is a block diagram showing a configuration of a vehicle periphery display device according to Embodiment 4 of the invention.

FIG. 10 is a block diagram showing a configuration of the vehicle periphery display device according to Embodiment 4 of the invention. The vehicle periphery display device shown in FIG. 10 is a vehicle periphery display device that receives an operation from the above carried-in device 19, and is configured with a vehicle control I/F 10, a camera group 11, a vehicle controller 12, a panorama generator 13, an information processor 14C, a display image generator 15B and a display 16. Note that, in FIG. 10, the configuration elements to which the same reference numerals as in FIG. 1 are applied function similarly to Embodiment 1, so that description thereof is omitted.

The carried-in device 19 is an information device that has been carried in the vehicle by a passenger from the outside, examples of which include a smartphone, a tablet PC and the like. Note that the carried-in device 19 can notify the information processor 14C of the vehicle periphery display device about the condition for specifying a clip image. Further, the carried-in device 19 can also display on its display the clip image determined according to this condition.

Similarly to Embodiment 1, based on the driving condition of the vehicle, the information processor 14C determines from the panorama image of the vehicle periphery the image area to be displayed (clip image area). Further, when the condition for clipping is specified from the carried-in device 19, the information processor 14C determines an image area that satisfies the specified condition, independently of the processing based on the driving condition of the vehicle.

Note that information indicative of the clip image area is, in either case, outputted from the information processor 14C to the display image generator 15B.

Similarly to Embodiment 1, the display image generator 15B generates a display image including the clip image area determined based on the driving condition of the vehicle, according to the display specification of the display 16. Further, when the clip image area that satisfies the condition specified from the carried-in device 19 has been determined by the information processor 14C, the display image generator 15B generates a display image including this clip image area, according to the display specification of the display of the carried-in device 19, independently of the processing based on the driving condition of the vehicle.

Next, the operation will be described.

Figure 11:
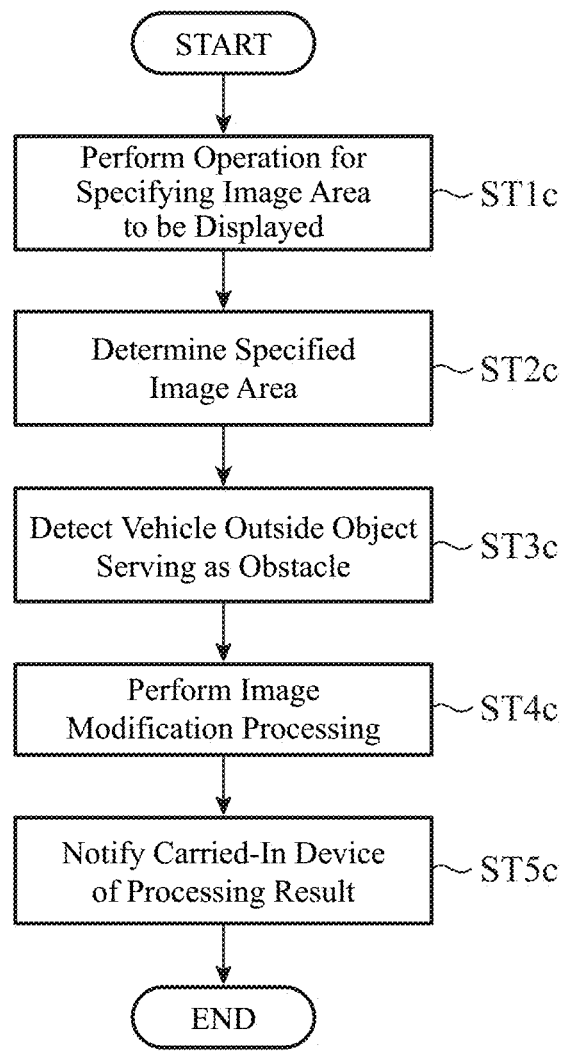
FIG. 11 is a flowchart showing processing of clipping from a panorama image an image area specified by a carried-in device and displaying it on the carried-in device.

FIG. 11 is a flowchart showing the operation of the vehicle periphery display device according to Embodiment 4, which shows processing when a clip image area is specified from the carried-in device 19.

Note that the operation of the flowchart can be executed in parallel with the processing shown in Embodiments 1 to 3.

First, a fellow passenger in the vehicle operates the carried-in device 19 to thereby notify the vehicle periphery display device of information indicative of a desired direction in the vehicle periphery as a condition for specifying the clip image area (Step ST1c). For example, a position of the area to be clipped from the panorama image is specified as the information indicative of the desired direction.

The information processor 14C determines from the panorama image of the vehicle periphery generated by the panorama generator 13, the clip image area that satisfies the condition specified from the carried-in device 19 (Step ST2c). Information indicative of the image area of the determination result is outputted from the information processor 14C to the display image generator 15B.

Then, the information processor 14C, upon determining the image area that satisfies the condition specified from the carried-in device 19, detects a vehicle outside object serving as an obstacle from among the imaging objects in the determined image area (Step ST3c). For example, from each panorama image generated from the camera images sequentially captured at every predetermined time interval by the camera group 11, the information processor sequentially determines the image area that satisfies the condition specified above. Upon image recognition of the vehicle outside object appearing in these image areas, if the vehicle outside object appearing in temporally sequential image areas is gradually becoming larger, this vehicle outside object is determined to be gradually approaching to the host vehicle, so that the vehicle outside object is judged to be an vehicle outside object that may be an obstacle against the host vehicle.

The display image generator 15B extracts from the panorama image generated by the panorama generator 13 the clip image area determined by the information processor 14C, and applies image processing to the image area so as to be matched to the display specification of the display of the carried-in device 19, to thereby generate the display image (Step ST4c).

Thereafter, the display image generator 15B does not notify the display 16 but notifies the carried-in device 19 of the display image generated as a result of the image modification processing (Step ST5c). This causes the display image to be displayed on the display of the carried-in device 19.

Note that when no condition for specifying an image area is notified from the carried-in device 19 communicably connected to the display image generator 15B, the display image generator 15B may display the display image to be displayed on the display 16 (display image that includes the image area determined according to the driving condition of the vehicle) also on the display of the carried-in device 19.

Further, the display image generator 15B may display on the display 16 the display image including the image area that satisfies the condition specified from the carried-in device 19. In this case, by the display image generator 15B, image processing matched to the display specification of the display 16 is applied to the image area that satisfies the specified condition, to thereby generate the display image.

As described above, according to Embodiment 4, the information processor 14C determines from the panorama image of the vehicle periphery, the image area matched to the condition specified from the carried-in device 19 that is an external device, so that the operator of the carried-in device can confirm the situation of a vehicle periphery specified by the operator.

Further, according to Embodiment 4, the display image generator 15B generates the display image including the image area matched to the condition specified from the carried-in device 19 that is an external device, and displays it on at least one of the display 16 and the display of the carried-in device 19. Thus, the operator of the carried-in device can confirm the situation of a vehicle periphery and becomes able to give an advice on driving to the driver on the basis of the confirmed situation.

It should be noted that unlimited combination of the respective embodiments, modification of any configuration element in the embodiments and omission of any configuration element in the embodiments may be made in the present invention without departing from the scope of the invention.

INDUSTRIAL APPLICABILITY

The vehicle periphery display device according to the invention can prompt the driver to get driving that is conscious of a vehicle outside object and can perform vehicle control to automatically avoid a collision with the vehicle outside object even if the driving operation by the driver is delayed, and thus, it is preferable as a safe-driving assisting device for vehicles.

DESCRIPTION OF REFERENCE NUMERALS AND SIGNS

10: vehicle control I/F, 11: camera group, 12: vehicle controller, 13: panorama generator, 14, 14A, 14B, 14C: information processor, 15, 15A, 15B: display image generator, 16: display, 17: application I/F, 18: vehicle information manager, 19: carried-in device.

The invention claimed is:

1. A vehicle periphery display device which displays a captured image of a vehicle periphery on a display, comprising:
    a vehicle control information receiver that acquires vehicle control information indicative of a driving condition of a vehicle;
    a panorama generator that combines images of the vehicle periphery in a plurality of capturing directions that are captured by a plurality of in-vehicle cameras, to thereby generate a panorama image of the vehicle periphery;
    an information processor that, based on the driving condition of the vehicle indicated by the vehicle control information, determines from the panorama image of the vehicle periphery, an image area to be displayed and judges about a collision possibility between a vehicle outside object appearing in the image area and the vehicle;
    a display image generator that generates a display image including the image area determined by the information processor, to thereby display it on the display; and
    a vehicle controller that controls the vehicle so as to avoid its collision with the vehicle outside object according to a result of the judgment about the collision possibility by the information processor.

2. The vehicle periphery display device of claim 1, wherein the display image generator generates the display image in which, in the image area to be displayed, an area where the vehicle outside object appears has been processed into a display form matched to the collision possibility between the vehicle outside object and the vehicle.

3. The vehicle periphery display device of claim 1, wherein the information processor determines from the panorama image of the vehicle periphery, an image area captured in a direction in which a driver's visibility decreases, as the image area to be displayed.

4. The vehicle periphery display device of claim 1, wherein the information processor outputs to the display image generator, information indicative of a capturing direction of the image area determined from the panorama image of the vehicle periphery; and
    the display image generator generates the display image that includes the image area and the information indicative of the capturing direction thereof.

5. The vehicle periphery display device of claim 1, further comprising a vehicle information manager that retains vehicle information indicative of a traveling condition of the vehicle and that presents the vehicle information upon request to its request source;
    wherein the information manager changes a size of the image area to be determined from the panorama image of the vehicle periphery, according to the traveling condition of the vehicle specified from the vehicle information.

6. The vehicle periphery display device of claim 1, wherein the information processor determines from the panorama image of the vehicle periphery, an image area matched to a condition indicated from an external device.

7. The vehicle periphery display device of claim 6, wherein the display image generator generates the display image including the image area matched to the condition specified from the external device, to thereby display it on at least one of the display and a display of the external device.

* * * * *